Aug. 12, 1930. H. JACOBY 1,772,949
VEHICLE TIRE PRESSURE INDICATOR
Filed Jan. 25, 1927
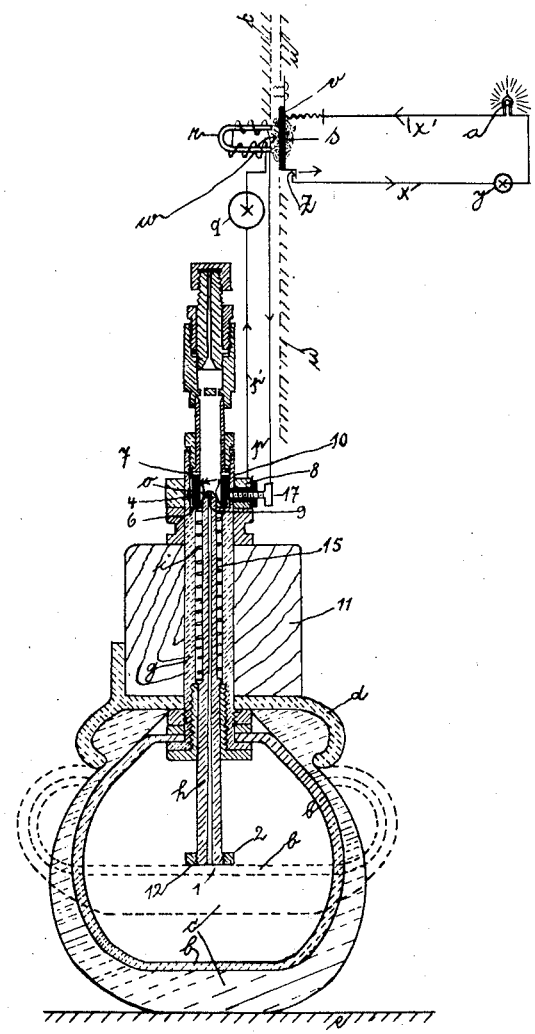
Inventor:
Hermann Jacoby Patented Aug. 12, 1930

1,772,949

UNITED STATES PATENT OFFICE

HERMANN JACOBY, OF EBERSTADT, NEAR DARMSTADT, GERMANY

VEHICLE TIRE-PRESSURE INDICATOR

Application filed January 25, 1927, Serial No. 163,547, and in Germany January 26, 1926.

My invention relates to an electrical system in which a decrease in the air pressure of vehicle tires is indicated on the dashboard of the vehicle.

I attain these objects by means of the system illustrated in the accompanying drawing.

The invention consists of two physically independent electrical circuits, the only connection between the several circuits being the occasional effect of the electromagnetic field, produced by one part of one circuit, upon a part of the second circuit, one of said circuits being mounted on the wheel of the vehicle, the other circuit being mounted on the chassis of the vehicle.

The circuit which is mounted on the wheel of the vehicle includes an electromagnet, a battery or an inductor, and a circuit closing device which is arranged to close the circuit from the battery or inductor through the electromagnet upon a decrease of pressure in the pneumatic tire which is mounted on the vehicle. The circuit on the chassis includes a battery, a signal lamp and a magnet-armature operated circuit closer, which armature is adapted to be operated to close the circuit to the signal lamp whenever the electromagnet of the wheel circuit is energized and adjacent the armature.

A pneumatic tire which consists of an outer casing $c$ and an inner tube $b$ are mounted on rim $d$ which latter is attached to the wheel felly 11. Tubular member $g$ is positioned to extend radially of the wheel, through the felly 11. The outer end of the tubular member $g$ is affixed in air-tight relation to the inner tube $b$. Slidably mounted within the tubular member $g$ there is placed a slide member $h$, which has a disc 2 affixed at the outer end thereof. The portion member $h$ which lies within tubular member $g$ is somewhat reduced in diameter, as at 15, to provide an annular space, in which the coil spring $i$ is disposed. Coil spring $i$ is arranged to normally force the slide member $h$ to protrude a short distance from the end of the tubular member $g$.

At the inner end of the tubular member $g$ and within the same there is mounted a contact collar 4 to which there is attached spring contact fingers 10—10. Collar 4 is insulated from the tubular member $g$ by means of insulating washers 6 and 7. At the side of tubular member $g$ and insulated therefrom there extends screw 17, which is insulated from and mounted in the collar 8 and contacts at its inner end with the contact collar 4.

The end 9 of the reduced portion 15 of slide member $h$ is normally out of contact with contact fingers 10—10. However, the slide member $h$ may be pressed inwardly against the action of spring $i$ until the end 9 contacts with spring contact fingers 10—10.

The wheel structure also carries an electromagnet $r$ and a dry battery or an inductor $q$ which are connected by circuit $p$—$p'$ to the tire circuit closer explained above.

On the frame of the vehicle there is mounted an armature $s$ which operates to close contacts Z when it is attracted by the electromagnet $r$. The contacts Z control a signal circuit $x$—$x'$ which includes signal lamp $a$ and battery $y$. The signal lamp $a$ may be mounted in any position in which it may be conveniently observed by the operator of the vehicle, as for instance, on the dashboard of the vehicle.

The magnet $r$ and armature $s$ are positioned with respect to each other as to be immediately adjacent each other when the circuit closer device $g$—$h$ is in vertical alignment between the earth and the axle of the wheel.

The operation of the device is as follows: When the tire $c$ becomes soft due to a leakage of the air therefrom, it will assume the position as shown in the dotted lines, when in contact with the earth. As the softness increases the inner tube 1 will gradually reach a position so as to press the slide member as at 12, and move member $h$ upward.

When the slide member $h$ is pressed upward a contact is established between 9 and 10—10 and a current flows through the following circuit: from one terminal of the battery or inductor $q$ to electro-magnet $r$, thence through circuit $p$ to screw 17, contact fingers 10—10, across to tip 9 of member 15, and thence through the body of the circuit closer, collar 8, circuit $p'$ and back to the second terminal of the battery or inductor. Electromagnet *r* is accordingly energized and the magnetic flux of the magnet attracts armature *s* and closes contacts Z, at which time a circuit is established through the signal light as follows: from one terminal of the battery *y* to signal lamp *a* through the circuit X' to armature *s*, contacts Z and back through circuit *x* to the other terminal of battery *y*, whereupon the light is illuminated and an indication is given of the deflation of the vehicle tire.

I have thus provided a simple and efficient device of the kind described and for the purposes specified.

It is obvious that minor changes may be made in the form and construction of the invention without departing from the spirit thereof. It is not therefore desired to confine the invention to the exact form herein shown and described but it is desired to include all such changes as come within the scope claimed.

Having thus described the invention, what is claimed as new, is:

In a system for signaling the deflation of a pneumatic tire on a wheeled vehicle, a wheel carried circuit including circuit closing means responsive to tire deflation, a source of current and an electromagnet, a frame carried circuit including a current responsive signal, a source of current and a circuit closer, the movable element of said circuit closer being an armature for said magnet, means mounting said armature adjacent the wheel and at a distance from the axis of the wheel which is equal to the distance the magnet is from said axis whereby when the tire's deflation switch is closed the magnet is energized, the armature is attracted and the signal circuit closed.

HERMANN JACOBY.